US012438375B2

(12) United States Patent
Ikeda et al.

(10) Patent No.: US 12,438,375 B2
(45) Date of Patent: Oct. 7, 2025

(54) POWER SUPPLY AND DEMAND SYSTEM

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/647,269

(22) Filed: Apr. 26, 2024

(65) Prior Publication Data
US 2024/0380210 A1  Nov. 14, 2024

(30) Foreign Application Priority Data
May 10, 2023  (JP) ................. 2023-077943

(51) Int. Cl.
*B60L 55/00* (2019.01)
*B60L 53/53* (2019.01)
*B60L 53/62* (2019.01)
*H02J 3/32* (2006.01)
*H02J 3/38* (2006.01)

(52) U.S. Cl.
CPC ............. *H02J 3/322* (2020.01); *B60L 53/53* (2019.02); *B60L 53/62* (2019.02); *B60L 55/00* (2019.02); *H02J 3/38* (2013.01)

(58) Field of Classification Search
CPC ............. H02J 3/322; H02J 3/38; B60L 53/53; B60L 53/62; B60L 55/00
See application file for complete search history.

(56) References Cited

U.S. PATENT DOCUMENTS

| | | | |
|---|---|---|---|
| 2017/0320529 A1 | 11/2017 | Nordbruch | |
| 2019/0111805 A1* | 4/2019 | Hidaka | B60L 53/35 |
| 2022/0242271 A1* | 8/2022 | Orihashi | B60L 53/63 |
| 2023/0018650 A1* | 1/2023 | Hopf | B60L 53/67 |

FOREIGN PATENT DOCUMENTS

JP  2017-538619 A  12/2017

* cited by examiner

*Primary Examiner* — Daniel Cavallari
(74) *Attorney, Agent, or Firm* — Sughrue Mion, PLLC

(57) ABSTRACT

An electric power supply and demand system used in a factory for manufacturing a vehicle includes: an on-vehicle secondary battery, in a manufacturing process of a factory, mounted on a vehicle capable of running in a factory by remote control; a central storage battery configured to be capable of supplying electric power to an equipment in the factory; a charging device configured to be capable of supplying electric power stored in the central storage battery to the on-vehicle secondary battery; a power receiving device configured to be capable of supplying electric power stored in the on-vehicle secondary battery to the central storage battery; and a power generating facility located in the factory and configured to be capable of supplying the generated electric power to the central storage battery.

4 Claims, 6 Drawing Sheets

POWER SUPPLY AND DEMAND SYSTEM

CROSS REFERENCE TO RELATED APPLICATIONS

This application claims priority to Japanese Patent Application No. 2023-077943, filed on May 10, 2023, the disclosure of which is entirely and for all purpose incorporated herein by reference.

BACKGROUND

The present disclosure relates to a power supply and demand system.

For example, Japanese Patent Application Publication No. 2017-538619 discloses a vehicle running method in which, in a manufacturing system for manufacturing a vehicle, the vehicle is caused to run from the end of an assembly line of the manufacturing system to a parking lot of the manufacturing system by remote control.

In a manufacturing system, fluctuations in the amount of power consumption due to a load and fluctuations in the amount of supply and demand of renewable energy may occur. In the manufacturing system, a technology capable of realizing supply and demand of electric power in the entire manufacturing system including a secondary battery mounted in a vehicle being manufactured has not been studied.

SUMMARY

The present disclosure can be realized as the following embodiments.

(1) According to an aspect of the present disclosure, a power supply and demand system used in a factory for manufacturing a vehicle is provided. The power supply-and-demand system includes, an on-vehicle secondary battery, in a manufacturing process of the factory, mounted on the vehicle capable of running in the factory by remote control, a central storage battery configured to be capable of supplying electric power to an equipment in the factory, a charging device configured to be capable of supplying electric power stored in the central storage battery to the on-vehicle secondary battery, a power receiving device configured to be capable of supplying electric power stored in the on-vehicle secondary battery to the central storage battery, and a power generating facility located in the factory, the power generating facility configured to be capable of supplying the generated electric power to the central storage battery.

According to the power supply and demand system of this aspect, by utilizing the on-vehicle secondary battery mounted on the vehicle in the manufacturing process as an energy resource capable of supplying and demanding electric power to the central storage battery, it is possible to realize a system capable of supplying and demanding electric power in the entire factory.

(2) The power supply and demand system of the above aspect may further include a control unit configured to acquire a transition of a power generating amount of the power generating facility and a transition of a power consumption amount of the central storage battery, and determine a target charging rate of the central storage battery by using the acquired transition of the power generating amount of the power generating facility and the transition of the power consumption amount of the central storage battery.

According to the power supply and demand system of this aspect, by providing the control unit, it is possible to adjust the power supply-and-demand balance in the entire factory.

(3) In the power supply and demand system of the above aspect, the control unit may determine a target charging rate of the central storage battery by using a transition of the number of vehicles produced in the factory.

According to the power supply and demand system of this aspect, it is possible to improve estimation accuracy of the power supply and demand by using the number of on-vehicle secondary batteries that is easier adjusting the charging rate in the manufacturing process.

(4) In the power supply and demand system of the above aspect, the control unit may prompt charging from the charging device to the on-vehicle secondary battery when a charging rate of the central storage battery is equal to or higher than a predetermined upper limit value or is predicted to be equal to or greater than the upper limit value.

According to the power supply and demand system of this aspect, it is possible to adjust the supply and demand balance of the power of the factory more efficiently by preferentially using the on-vehicle secondary battery as an energy resource that is easier adjusting the charging rate in the manufacturing process as (5) In the power supply and demand system of the above aspect, the control unit may prompt charging of the central storage battery from the on-vehicle secondary battery via the power receiving device when a charging rate of the central storage battery is equal to or less than a predetermined lower limit value or is predicted to be equal to or less than the lower limit value.

According to the power supply and demand system of this aspect, it is possible to adjust the supply and demand balance of the power of the factory more efficiently by preferentially using the on-vehicle secondary battery as an energy resource that is easier adjusting the charging rate in the manufacturing process.

The present disclosure can be implemented in various forms other than the power supply system. For example, the present disclosure can be implemented in the form of a power supply and power demand adjustment device, a remote automatic driving system, a power demand adjustment method, a charging method of a central storage battery, a server, a manufacturing method of a vehicle, a charging device, a control method of a charging device, a computer program for realizing the control method, a non-transitory recording medium storing the computer program, and the like.

BRIEF DESCRIPTION OF THE DRAWINGS

Various embodiments in the disclosure are disclosed in the following detailed description and the accompanying drawings.

DETAILED DESCRIPTION

A. First Embodiment

Figure 1:
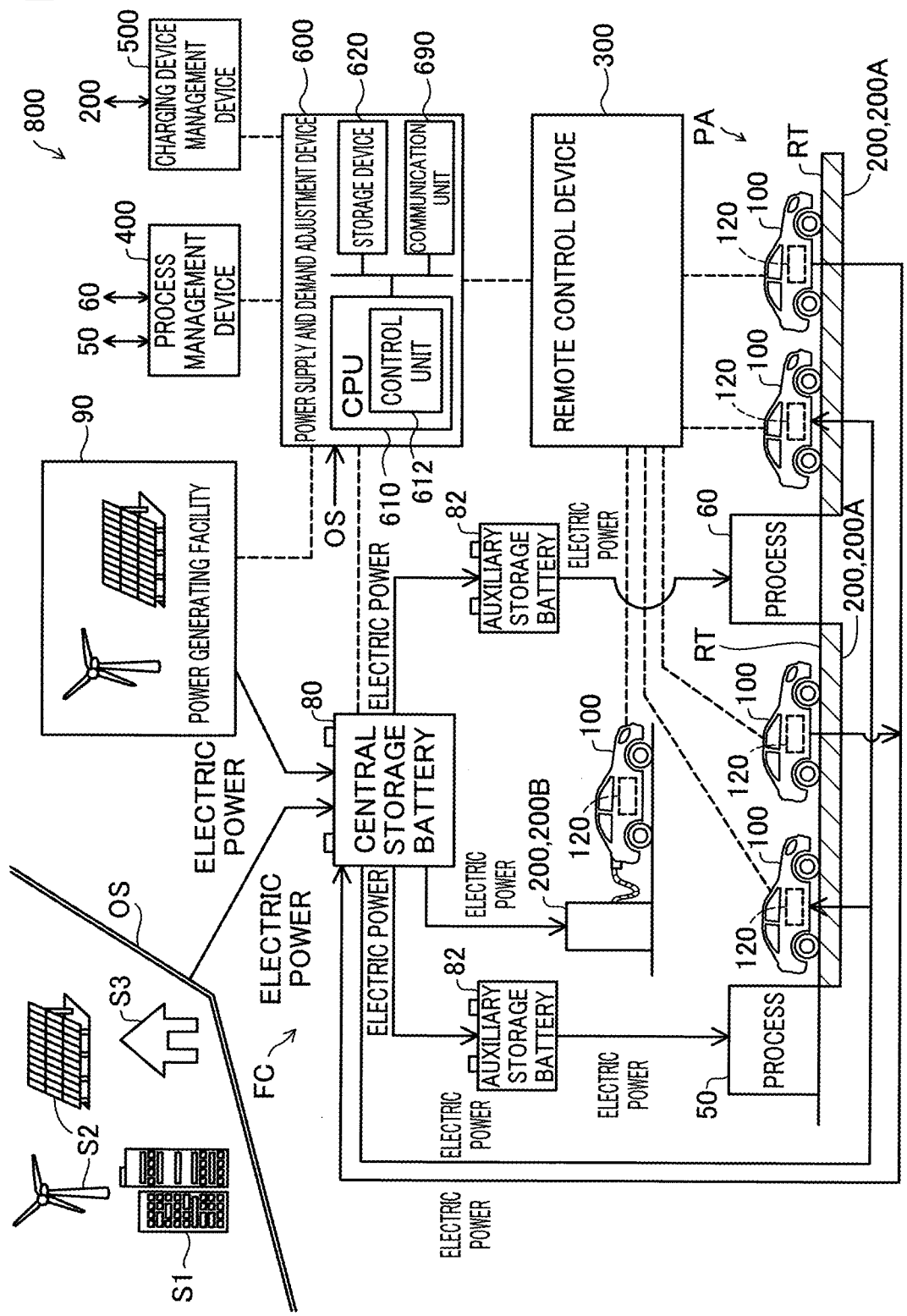
FIG. 1 is an explanatory diagram showing a schematic configuration of a power supply and demand system according to a first embodiment of the present disclosure.

FIG. 1 is an explanatory diagram illustrating a schematic configuration of a power supply and demand system 800 according to a first embodiment of the present disclosure. The electric power supply and demand system 800 controls the supply and demand of electric power of a factory FC that manufactures the vehicles 100. The vehicle 100 is, for example, a passenger car, a truck, a bus, a construction vehicle, or the like. The power supply and demand system 800 includes energy resources of a central storage battery 80, a power generating facility 90 capable of charging the central storage battery 80, a battery 120 mounted on the vehicle 100, and a charging device 200 capable of charging the battery 120.

The central storage battery 80 supplies and demands electric power to and from the respective energy resources inside and outside the factory FC. The central storage battery 80 is an industrial storage battery, and may be, for example, a lithium-ion battery or a sodium-sulfur battery (sodium-sulfur battery). The battery 120, or on-vehicle battery, is, for example, a rechargeable on-vehicle secondary battery such as a lithium-ion battery or a nickel-metal hydride battery. The battery 120 stores electric power and the like used for running of the vehicle 100. The battery 120 may further include an auxiliary battery having a low voltage capable of supplying electric power to auxiliary equipment of the vehicle 100. The central storage battery 80 can be charged by, for example, electric power purchased from the power generating facility 90, an operator OS outside the factory FC, or the like. OS of operators includes, for example, S1 of operators who retail electricity, S2 of renewable energy generators, and S3 of consumers.

The power generating facility 90 generates electric power that is available at the factory FC. As the power generating facility 90, for example, a power generating facility using renewable energy such as solar light, wind power, geothermal power, small and medium hydropower, biomass, or the like can be employed. The power generating facility 90 may further include a power generator using fossil energy such as petroleum, coal, and natural gas. The power generated by the power generating facility 90 is supplied to the central storage battery 80.

The charging device 200 supplies the electric power supplied from the central storage battery 80 to the battery 120 of the vehicle 100. In the embodiment of FIG. 1, the charging device 200 includes a non-contact charging device 200A that performs power transfer using magnetic field resonant coupling, and a non-contact charging device 200B that connects and charges the power supply connector to the vehicle 100. The charging device 200 may be constituted by only one of a non-contact type and a contact type. In the present embodiment, as will be described later, the charger 200A is laid on the track RT of the vehicle 100, and can receive electric power transmitted from the battery 120 of the vehicle 100 in a non-contact manner, and can be supplied to the central storage battery 80. By providing a facility capable of transmitting and receiving power to and from the road RT of the vehicle 100, it becomes easy to use the battery 120 of the vehicle 100 during running for adjusting the power supply and demand. In the supply and demand of electric power between the vehicles 100 and the charging device 200, from the viewpoint of suppressing power dissipation, it is preferable that the contact-type charging device 200B having higher power transmitting efficiency be used in preference to the non-contact-type charging device 200A. In addition, in the supply and demand of electric power between the vehicle 100 and the charger 200A, it is preferable that the electric power transmitting in a state where the vehicle 100 is stopped is prioritized over the electric power transmitting in a state where the vehicle 100 is moved, from the viewpoint of suppressing the electric power loss. However, in this case, it is preferable that the processing be performed on the assumption that the productivity of the vehicle 100 is not affected. The charging device 200A may be configured to perform only one of charging from the central storage battery 80 to the battery 120 and charging from the battery 120 to the central storage battery 80.

As shown in FIG. 1, the power supply and demand system 800 may further include an auxiliary storage battery 82 as an energy resource. The secondary storage battery 82 is provided for each process or for each building in the manufacturing process of the factory FC. The auxiliary storage battery 82 is electrically connected to the central storage battery 80, and supplies electric power received from the central storage battery 80 to each process and the like. When the charge rate (SOC: State of Charge) of the central storage battery 80 is higher than the predetermined charge rate, power is supplied from the central storage battery 80 to the auxiliary storage battery 82 in order to suppress degradation of the central storage battery 80 and avoid full charge. When the charge rate of the central storage battery 80 is lower than the predetermined charge rate, electric power is supplied from the auxiliary storage battery 82 to the central storage battery 80 in order to suppress deterioration of the central storage battery 80. In other words, the auxiliary storage battery 82 has a function of alleviating excess or deficiency of the charging rate of the central storage battery 80. The central storage battery 80 and the auxiliary storage battery 82 may be singular or any number of two or more.

The power supply and demand system 800 may further include a power supply and demand adjustment device 600, a remote control device 300, a process management device 400, and a charging device management device 500. The process management device 400 manages manufacturing data of each process in the manufacturing process of the factory FC, power consumed in each process, and the like. "Manufacturing data" includes, for example, the planned operation of the factory FC, the number of works in process, the number of products being processed, and the number of products to be manufactured per unit-period. The charging device management device 500 manages the control of power transmitting and reception by the charging device 200, the amount of electric power related to power transmitting and reception by the charging device 200, and the like.

The remote control device 300 carries the vehicle 100 in the manufacturing process in the factory FC by causing the vehicle 100 to automatically travel by remote control. The conveyance of the vehicle 100 using the automatic travel by the remote control is also referred to as "self-propelled conveyance".

As shown in the lower part of FIG. 1, the factory FC is provided with a pre-process part 50, a post-process part 60, and a track RT of the vehicles 100. The track RT is a conveyance section of the vehicle 100 between the respective processes or a section in which the completed vehicle 100 is conveyed to a shipping PA for waiting for shipping. Each step may exist across multiple locations having different locations. "Vehicle 100 travels in a factory FC" includes cases where vehicle 100 travels not only on a private road but also on a public road in order to move between processes in a plurality of locations.

The pre-process part 50 and the post-process part 60 are various processes belonging to the manufacturing process of the vehicle 100. The pre-process part 50 is, for example, an assembly process of assembling a vehicle component such as the battery 120 to the vehicle body. The post-process part 60 is, for example, an inspection process of the vehicle 100. The vehicle 100 is completed as a product after the post-process part 60. The completed vehicle 100 travels to the shipping site PA by remote control, and is shipped to the corresponding shipping destination for each vehicle 100.

Figure 2:
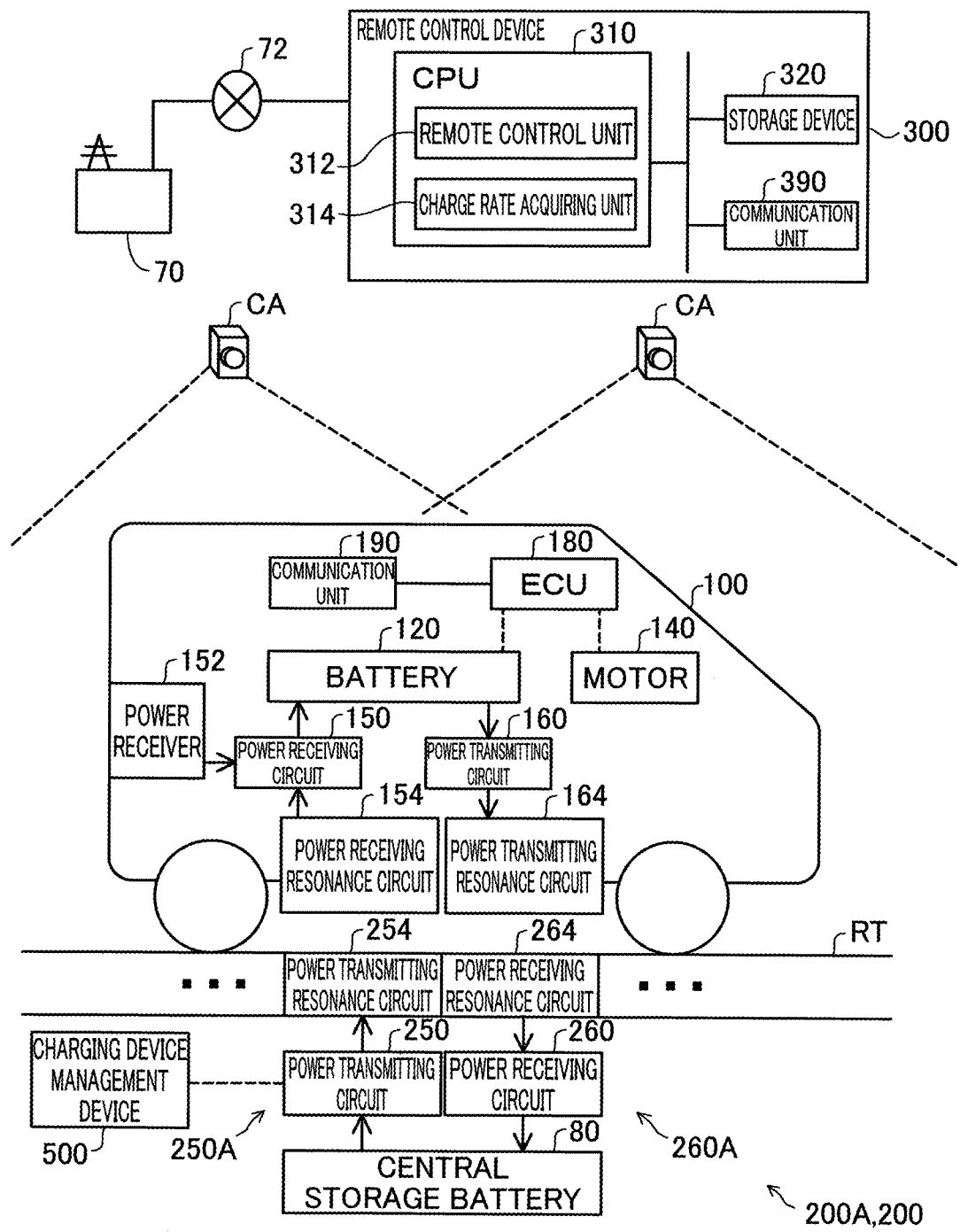
FIG. 2 is a diagram showing the configuration of the remote control device and the vehicle.

FIG. 2 is an explanatory diagram illustrating a configuration of the remote control device 300 and the vehicle 100. The vehicle 100 includes a vehicle communication unit 190, a motor 140, a battery 120, an ECU (Electronic Control Unit) 180, a power receiving device, and a power transmitting device. The vehicle communication unit 190 performs radio communication with an external device of the vehicle 100, such as the remote control device 300 connected to the network 72, via the access point 70 in the factory FC. The vehicle communication unit 190 may transmit information such as a charging rate of the battery 120 to the charging device 200, the remote control device 300, and the like.

The power receiving device includes a power receiving circuit 150, a power receiver 152, and a power receiving resonance circuit 154. The power receiver 152 is a power supply inlet or the like corresponding to a power supply connector of the charger 200B. The power receiving resonance circuit 154 includes a power receiving coil and a power receiving resonance capacitor (not shown). The power receiving circuitry 150 is a rectifier, a DC/DC converter, or the like. When AC power is supplied from the power receiver 152 or the power receiving resonance circuit 154, the power receiving circuit 150 converts the supplied AC power into DC power by a rectifier. The converted DC power is supplied to the battery 120 via DC/DC converters.

The power transmitting device includes a power transmitting circuit 160 and a power transmitting resonance circuit 164. The power transmitting circuit 160 is an inverter or the like. The power transmitting circuit 160 converts DC power supplied from the battery 120 into AC power having an operating frequency, and supplies the AC power to the power transmitting resonance circuit 164. The power transmitting circuit 160 may include a rectifier circuit, a filter circuit, and the like. The power transmitting resonance circuit 164 includes a power transmitting coil and a power transmitting resonance capacitor (not shown).

The charger 200A includes a power transmitting device 250A and a power receiving device 260A. The power transmitting device 250A includes a power transmitting resonance circuit 254 and a power transmitting circuit 250, and the power receiving device 260A includes a power receiving resonance circuit 264 and a power receiving circuit 260. The power transmitting circuit 250 is an inverter or the like. The power receiving circuitry 260 is a rectifier, a DC/DC converter, or the like. The power receiving resonance circuit 264 includes a power receiving coil and a power receiving resonance capacitor (not shown). The power transmitting resonance circuit 254 includes a power transmitting coil and a power transmitting resonance capacitor (not shown). When AC power is supplied from the power receiving resonance circuit 264, the power receiving circuit 260 converts the supplied AC power into DC power by means of a rectifier. The converted DC power is supplied to the central storage battery 80 via DC/DC converters.

The power transmitting resonance circuit 254 and the power receiving resonance circuit 264 of the charger 200A are arranged continuously over the entire track RT. When the power transmitting resonance circuit 254 and the power receiving resonance circuit 154 of the vehicle 100 face each other, an induced electromotive force is generated in the power receiving resonance circuit 154. When the power receiving resonance circuit 264 and the power transmitting resonance circuit 164 of the vehicle 100 face each other, an induced electromotive force is generated in the power receiving resonance circuit 264. In the present embodiment, the power transmitting circuit 250 and the power receiving circuit 260 are controlled by the charging device management device 500. The exchange of electric power between the battery 120 and the charging device 200A is controlled by the charging device management device 500.

The motor 140 is, for example, an AC synchronous motor, and functions as an electric motor and a generator. When the motor 140 functions as an electric motor, the motor 140 is driven using the electric power stored in the battery 120 as a power source. The output of the motor 140 is transmitted to the wheels via the speed reducer and the axle. When the vehicle 100 decelerates, the motor 140 functions as a generator that utilizes the rotation of the wheels, and generates regenerative electric power. When the electric power supplied from the charging device 200 to the power receiving device and the regenerative electric power generated by the motor 140 are supplied to the battery 120, the battery 120 is charged and SOC of the battery 120 is increased. Between the battery 120 and the motor 140, an inverter, a step-up converter, and a PCU (Power Control Unit including a DC/DC converter may be connected.

ECU180 is mounted on the vehicle 100 and executes various kinds of control of the vehicle 100. ECU180 includes a memory such as a HDD, an optical recording medium, and a semiconductor memory, and a CPU as a central processor. By CPU executing various computer programs stored in the memories, functions such as a driving control unit that executes driving control of the vehicles 100 are realized. The "driving control" is, for example, adjustment of acceleration, speed, and steering angle. In the remote control, ECU180 controls the respective actuators mounted on the vehicle 100 in accordance with a control signal of the remote control received from the remote control device 300 via the vehicle communication unit 190. In addition, ECU180 calculates the charge rate of the battery 120 using, for example, the cell voltage, the current, the temperature, and the like of the battery 120.

The remote control device 300 includes a CPU310 as a central processing unit, a storage device 320, and a remote communication unit 390. These are connected to each other via an internal bus, an interface circuit, and the like. The remote communication unit 390 communicates with the vehicle 100, the power supply and demand adjustment device 600, and the like via the network 72.

The storage device 320 is, for example, a hard disk drive (RAM, ROM, HDD), a solid state drive (SSD), or the like. When the computer program stored in the storage device 320 is executed by CPU310, CPU310 functions as the remote control unit 312 and the charge rate acquiring unit 314. However, some or all of these functions may be configured by a hardware circuit. The charging rate acquisition unit 314 acquires the charging rate of the battery 120 from the vehicle 100. The obtained charging rate of the battery 120 is output to the power supply/demand adjustment device 600.

The remote control unit 312 transmits a control signal requesting remote control of the vehicle 100 to the vehicle 100 via the remote communication unit 390. When the vehicle 100 receives a request for remote control, a driving control is realized by ECU180, so that the vehicle 100 automatically travels. The remote control unit 312 causes ECU180 to execute driving control of the vehicle 100 while analyzing images of the vehicle 100 acquired by the camera CA disposed in the factory FC. The remote control unit 312 causes the vehicle 100 to travel along the target route by adjusting the relative position of the vehicle 100 with respect to the target route set in advance in the track RT through the image-analysis.

Returning to FIG. 1, the power supply and demand adjustment device 600 manages the supply and demand of power at the factory FC by supervising the energy resources in the factory FC and the operator OS. The power supply and demand adjustment device 600 may also be referred to as a so-called aggregator. The power supply-demand adjustment device 600 includes a CPU610 as a central processing unit, a storage device 620 such as a RAM, ROM, HDD and an SSD, and a communication unit 690 having a radio communication function. These are connected to each other via an internal bus or an interface circuit. The communication unit 690 is a communication device for communicating with external devices such as the vehicle 100, the power generating facility 90, the remote control device 300, the process management device 400, and the charging device management device 500. When CPU610 executes the programs stored in the storage device 620, some or all of the functions of the control unit 612 and the like are realized.

The control unit 612 regulates the supply and demand of the electric power in the factory FC by controlling the energy resource. The supply and demand of electric power in the factory FC include, for example, the amount of electric power purchased from the operator OS, the amount of electric power generated by the power generating facility 90, the amount of electric power consumed by the central storage battery 80, and the like. Specifically, the control unit 612 acquires the transition of the supply and demand of the electric power by each energy resource. The control unit 612 determines the target charging rate of the central storage battery 80 so as to avoid imbalance in the acquired transition of the power supply and demand. The control unit 612 controls each energy resource in order to realize the determined target charging rate.

For example, a machine learning model using a neural network (NN: Neural Network) can be used to predict power supply and demand. As the machine learning model, for example, a model suitable for time-series analysis using past data is used. For predicting power supply and demand, for example, a model having an architecture such as a recursive neural network (RNN: Recurrent neural network), a convolutional neural network (CNN: Convolutional Neural Network), a generalized regression neural network (General Regression Neural Network), or a random forest (Random Forest) is suitable. In the present embodiment, a RNN having a recursive structure such as long-term memory (LSTM: Long Short-Term Memory) and short-term memory capable of long-term time-series analysis is used. The machine learning model stored in the storage device 620 is a learned model using power supply and demand data based on past energy resources as learning data. As a neural network training method, a support vector machine (SVM) or an error back propagation method (Backpropagation) is preferably used. Note that the prediction of the power supply and demand is not limited to machine learning, and various methods such as regression analysis such as multiple regression analysis and multivariate analysis may be used.

The control unit 612 predicts, for example, an amount of generated electric power per unit time in the photovoltaic power generating device in the power generating facility 90. In this case, the amount of generated electric power per unit time in the photovoltaic power generating device is set as a dependent variable. The solar radiation intensity, which time of one day (24 hours), the solar altitude, binary data of daytime or not, weather information such as weather and temperature, and the like are set as independent variables. The solar altitude is an angle up to the sun measured with the horizon direction being zero degrees and the zenith being an angle of 90 degrees. The control unit 612 determines the target charging rate of the central storage battery 80 by using the predicted transition of the generated electric power amount.

The control unit 612 may further determine the target charging rate of the central storage battery 80 by predicting the transition of the power consumption of the central storage battery 80 using the manufacturing information. For example, the control unit 612 may determine the target charge rate of the central storage battery 80 by predicting the transition of the power consumed by the central storage battery 80 using the transition of the number of vehicles 100 produced in the factory FC. The transition of the number of vehicles 100 produced can be acquired by using the manufacturing information of each process acquired from the process management apparatus 400, the order quantity of the vehicle 100, and the like. When the number of vehicles 100 produced is large, the amount of electric power consumed in each process or each vehicle 100 may be larger than in a case where the number of vehicles is small. Further, if the number of vehicles 100 produced is large, the number of batteries 120 in the factory FC is increased, so that the total amount of electric power in the factory FC may be large. Therefore, it is possible to improve the prediction accuracy of the transition of the charging rate of the central storage battery 80 by using the transition of the production number of the vehicle 100.

The control unit 612 may further determine the target charge rate of the central storage battery 80 by using the manufacturing state of the factory FC. "Manufacturing Situation" means the deviation of the actual manufacturing time relative to the target manufacturing time. The "target manufacturing time" is a target value of a manufacturing time required for processing of one vehicle 100. The target manufacturing time may be referred to as "tact time." If production is delayed, the amount of electric power consumed in each process and each vehicle 100 may be larger than normal. By using the manufacturing state of each process, it is possible to improve the prediction accuracy of the transition of the charging rate of the central storage battery 80.

The control unit 612 may further determine the target charge rate of the central storage battery 80 by using the transition of the amount of electric power received from outside the factory FC such as the operator OS. The control unit 612 may determine the target charge rate of the central storage battery 80 by using a power generating failure at the operator OS such as an accident, a power transmitting failure between energy resources, or the like.

Figure 3:
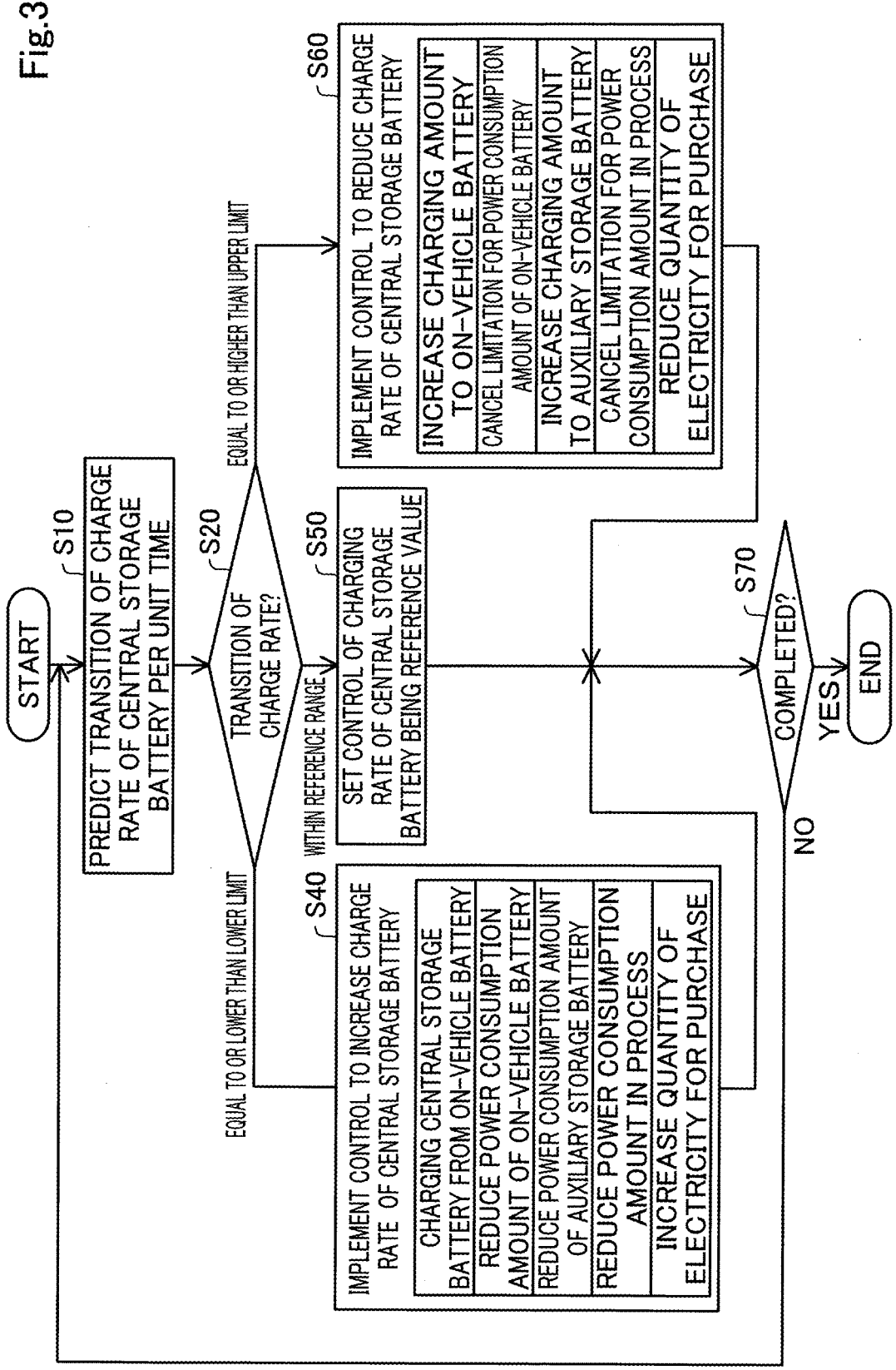
FIG. 3 is a flowchart showing the processing routine of the power supply-demand adjustment process.

FIG. 3 is a flowchart illustrating a processing routine of the power supply-demand adjustment processing according to the present embodiment. This flow is started, for example, when the power supply/demand adjustment device 600 is turned on, or at a predetermined adjustment timing of power supply/demand, or the like. This flow may be repeatedly executed at predetermined time intervals, for example, one hour, one day, etc.

In step S10, the transition of the charge rate of the central storage battery 80 per unit time is predicted. In step S20, it is checked whether the charge rate of the central storage battery 80 is within a predetermined reference range including a predetermined reference value within the unit time. When it is within the reference range (S20: within the reference range), the control unit 612 controls the respective energy resources such that the power consumed by the central storage battery 80 satisfies the reference value.

Figure 4:
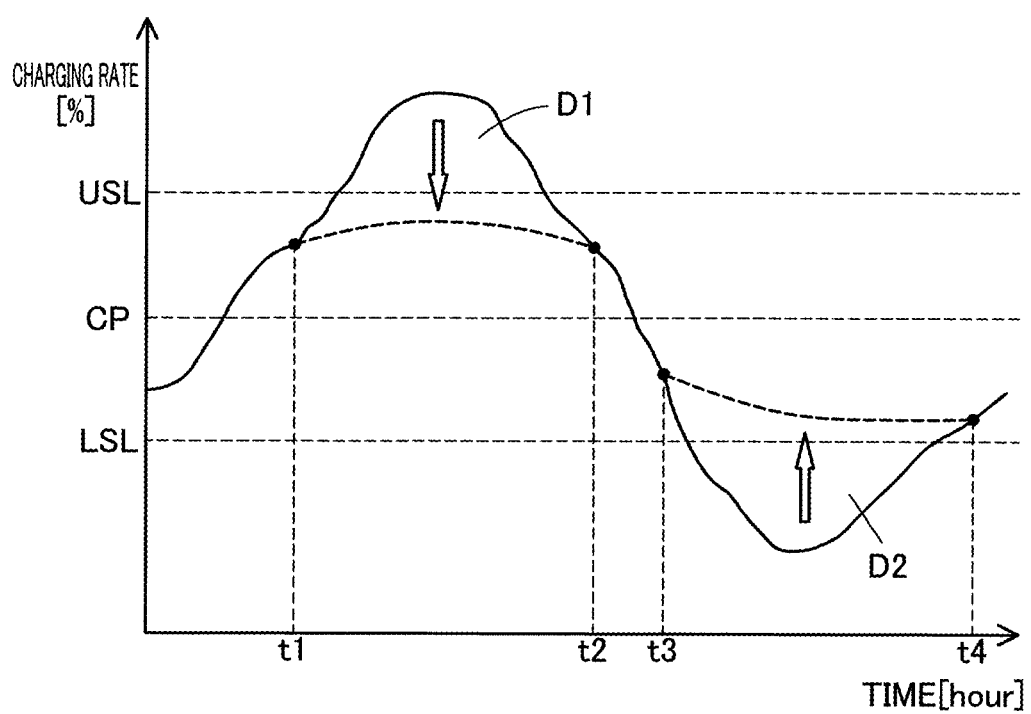
FIG. 4 is an explanatory diagram showing an example of the transition of the charge rate of the central storage battery.

FIG. 4 is an explanatory diagram illustrating an example of the transition of the charging rate of the central storage battery 80. As illustrated in FIG. 4, the charge rate of the central storage battery 80 is provided with an upper limit value USL, a lower limit value LSL, and a reference value CP that are predetermined for managing the charge rate of the central storage battery 80. The range of the lower limit value LSL or more and the upper limit value USL or less is the reference range.

As shown in the area D1 of FIG. 4, when the charge rate of the central storage battery 80 is equal to or higher than the upper limit value USL of the reference range, or when it is predicted that the charge rate is equal to or higher than the upper limit value USL (S20: equal to or higher than the upper limit value), the control unit 612 shifts the process to the step S60. In step S60, the control unit 612 increases the demand for the electric power stored in the central storage battery 80 in order to reduce the charge rate of the central storage battery 80. Consequently, it is possible to suppress or prevent the charge rate of the central storage battery 80 from becoming equal to or higher than the upper limit USL.

The control unit 612 executes, for example, at least one of the following processes in order to increase the demand for the electric power stored in the central storage battery 80.

(1) A process of charging the battery 120 from the central storage battery 80 via the charging device 200A. However, in this case, it is preferable to avoid that SOC of the battery 120 falls within the degradation area of the battery 120.

(2) A process of causing each vehicle 100 to travel by the running method in which the restriction for suppressing the power consumption of the battery 120 is released. Examples of restrictions for suppressing the power consumption of the battery 120 include, for example, restrictions on the acceleration and the vehicle speed of the vehicle 100, and restrictions on the number of times of starting and stopping.

(3) A process of increasing the amount of charge from the central storage battery 80 to the auxiliary storage battery 82 or the process of increasing the power consumption of the auxiliary storage battery 82.

(4) A process of cancelling the limitations on power consumption of loads in the factory FC, such as air conditioning, lighting, and manufacturing facilities.

(5) A process of reducing the quantity of electricity purchased from the operator OS.

For example, in a case where the solar radiation intensity becomes stronger than normal in a predetermined time period, the amount of power generated by the photovoltaic power generating device as the power generating facility 90 increases. Therefore, it is predicted that the amount of electricity stored in the central storage battery 80 becomes higher than the reference value as in the time t1 to time t2 in FIG. 4. In this case, the control unit 612 increases the demand for the electric power stored in the central storage battery 80, for example, in order to lower the target charging rate of the central storage battery 80. Specifically, the control unit 612 increases the amount of electric power supplied from the central storage battery 80 to the auxiliary storage battery 82 and the amount of electric power supplied from the charging device 200 to the battery 120 of the vehicle 100 in the time period. As a result, the target charge rate of the central storage battery 80 in the time period can be brought close to the reference value.

As shown in the area D2 of FIG. 4, when the charge rate of the central storage battery 80 is equal to or lower than the lower limit value LSL of the reference range, or when it is predicted that the charge rate is equal to or lower than the lower limit value LSL (S20: equal to or lower than the lower limit value), the control unit 612 shifts the process to the step S40. In step S40, the control unit 612 reduces the demand for the electric power stored in the central storage battery 80 in order to increase the charge rate of the central storage battery 80. Consequently, it is possible to suppress or prevent the charge rate of the central storage battery 80 from falling below the lower limit LSL.

The control unit 612 executes, for example, at least one of the following processes in order to reduce the demand for the electric power stored in the central storage battery 80.

(1) A process of charging the central storage battery 80 from the battery 120 via the charging device 200A. However, in this case, it is preferable to avoid that SOC of the battery 120 falls within the degradation area of the battery 120. Further, it is preferable that the power supply from the battery 120 to the central storage battery 80 is restricted so as to be executed only under a predetermined condition. The predetermined condition is, for example, a case where the generated electric power amount of the power generating facility 90 and the electric power amount supplied from the operator OS outside the factory FC are predicted to be equal to or less than a predetermined electric power amount. With this configuration, it is possible to suppress or prevent the occurrence of electric power shortage during the self-propelled conveyance of the vehicle 100.

(2) A process of causing each vehicle 100 to run by a running method of suppressing power consumption of the battery 120. Examples of the running method for suppressing the power consumption of the battery 120 include reduction of the acceleration and the vehicle speed of the vehicle 100 and reduction of the number of times the vehicle 100 starts and stops.

(3) A process of suppressing power consumption of the auxiliary storage battery 82.

(4) A process of reducing the power consumption of the facilities in each process within the factory FC such as air conditioning, lighting, manufacturing facilities.

(5) A process of increasing the quantity of electricity purchased from the operator OS.

For example, when the control unit 612 acquires weather information indicating rainy weather in a predetermined time period such as from the time t3 to the time t4 illustrated in FIG. 4, the amount of power generated by the photovoltaic power generating device as the power generating facility 90 is reduced. Therefore, it is predicted that the amount of electricity stored in the central storage battery 80 is lower than the reference value as in the time t3 to the time t4 in FIG. 4. In this case, for example, the control unit 612 may determine the target charge rate such that the charge rate of the central storage battery 80 in the period from the time t1 to the time t2, which is earlier than the time period, is higher in advance. In the embodiment of FIG. 4, the charge rate of the central storage battery 80 may be set so as not to decrease in the area D1. In this case, it is possible to prevent the storage capacity of the central storage battery 80 from being lower than the reference value without adjusting the charge rate of the central storage battery 80 in the area D2.

In addition, the control unit 612 may cause the respective energy resources to execute, for example, increasing the amount of electric power purchased from the operator OS, supplying surplus electric power stored in the battery 120 of the vehicle 100 to the central storage battery 80, and suppressing the electric power consumed by the battery 120 by self-propelled conveyance such as reducing the running speed of the vehicle 100 so that the charge rate of the central storage battery 80 becomes higher than the reference value. In this case, when the charging rate of the battery 120 when the charging rate of the central storage battery 80 is lower than the reference value is compared with the charging rate of the battery 120 when the charging rate of the central storage battery 80 is higher than the reference value, the charging rate of the battery 120 when the charging rate of the central storage battery 80 is higher than the reference value is higher.

In step S70, the control unit 612 checks whether the estimation of the transition of the charge rate of the central storage battery 80 during the predetermined period has been completed. When the estimation is not completed (S70: NO), the control unit 612 returns the process to step S10. When the prediction of the predetermined period has been completed (S70: YES), the process ends.

As described above, the power supply and demand system 800 of the present embodiment includes the battery 120 mounted on the vehicle 100 capable of running in the factory FC by remote control, the central storage battery 80 capable of supplying electric power to the facility of the factory FC, the charging device 200 capable of supplying the electric power stored in the central storage battery 80 to the battery 120, the power receiving device 260A capable of supplying the electric power stored in the battery 120 to the central storage battery 80, and the power generating facility 90 capable of supplying the generated electric power to at least the central storage battery 80. By utilizing the battery 120 mounted on the vehicle 100 as a product as an energy resource capable of supplying and demanding power to the central storage battery 80, it is possible to efficiently adjust the supply-demand balance of the power of the factory FC. The battery 120 mounted on the vehicle 100 as a product is a so-called new one, and is suitable for use in adjusting the charging rate. Further, if the number of vehicles 100 manufactured increases, the number of batteries 120 also increases, and the range of energy resources is expanded, so that the supply-demand balance can be adjusted more efficiently.

The power supply and demand system 800 of the present embodiment further includes a control unit 612 that determines a target charging rate of the central storage battery 80 by using the transition of the power generating amount of the power generating facility 90 and the transition of the power consumption amount of the central storage battery 80. By providing the control unit 612, it is possible to control energy resources and to adjust the power supply-demand balance of the entire factory FC.

According to the power supply and demand system 800 of the present embodiment, the control unit 612 determines the target charge rate of the central storage battery 80 by using the transition of the number of vehicles 100 produced in the factory FC. The battery 120 that has just been installed in the newly manufactured vehicle 100 is easy to adjust the charging rate, and is suitable as an energy resource. By using the number of batteries 120 suitable as energy resources, it is possible to improve the estimation accuracy of power supply and demand.

According to the power supply and demand system 800 of the present embodiment, when the charging rate of the central storage battery 80 is equal to or higher than the predetermined upper limit value USL or is predicted to be equal to or higher than the upper limit value USL, the control unit 612 prompts charging from the charging device 200 to the battery 120. By preferentially using the battery 120 suitable as the energy resource as the energy resource, it is possible to efficiently adjust the supply-demand balance of the power of the factory FC. In addition, it is possible to suppress or prevent insufficient charging rate of the battery 120 of the vehicle 100, and it is possible to suppress or prevent a problem that the vehicle 100 is depleted of electricity during self-propelled conveyance.

According to the power supply/demand system 800 of the present embodiment, when the charge rate of the central storage battery 80 is equal to or less than the predetermined lower limit value LSL or is predicted to be equal to or less than the lower limit value LSL, the control unit 612 prompts the battery 120 to charge the central storage battery 80 via the charging device 200A. By preferentially using the battery 120 suitable as the energy resource as the energy resource, it is possible to efficiently adjust the supply-demand balance of the power of the factory FC.

B. Other Embodiments (B1) In the above-described embodiment, the power supply and demand adjustment device 600 includes the control unit 612, and the control unit 612 determines the target charging rate of the central storage battery 80. In contrast, the control unit 612 may not be provided. In this case, for example, an operator who has checked the transition of the power generating amount of the power generating facility 90 and the transition of the power consumption amount of the central storage battery 80 can manually adjust the target charging rate of the central storage battery 80.

(B2) Although the vehicle 100 is used for explanation in each above embodiments a moving object may be used. The "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

(B3) At least one of the remote control devices 300, the process management device 400, and the charging device management device 500 may include all or a part of the functions of the control unit 612 and the like included in the power supply/demand adjustment device 600. In addition, all or a part of the functions of the remote control device 300, such as the remote control unit 312 and the charging rate acquisition unit 314, may be provided in the power supply/demand adjustment device 600. All or a part of the functions of the process management device 400 and the charging device management device 500 may be provided in the power supply/demand adjustment device 600.

(B4) In the above embodiment, an example in which the vehicle 100 is a passenger car, a truck, a bus, a construction vehicle, or the like has been described. In contrast, the vehicle 100 may further include various automobiles, trains, and the like, such as a two-wheeled vehicle and a four-wheeled vehicle. In addition, the vehicle 100 may be various moving objects other than the vehicle 100. "Mobile body" means an object that can move. The moving body includes a ship, an aircraft, a robot, a linear motor car, and the like. In this case, the expressions "vehicle" and "vehicle" in the present disclosure can be appropriately replaced with "moving body", and the expression "running" can be appropriately replaced with "moving".

(B5) In the above-described embodiment, the control unit 612 determines the target charging rate of the central storage battery 80. On the other hand, the control unit 612 may determine the target charging rate of the central storage battery 80 by determining not only the charging rate but also information equivalent to the charging rate of the battery 120, such as the amount of electric power, the electric capacity, the electric quantity, the cell voltage of the battery 120, and the cell current stored in the battery 120.

Figure 5:
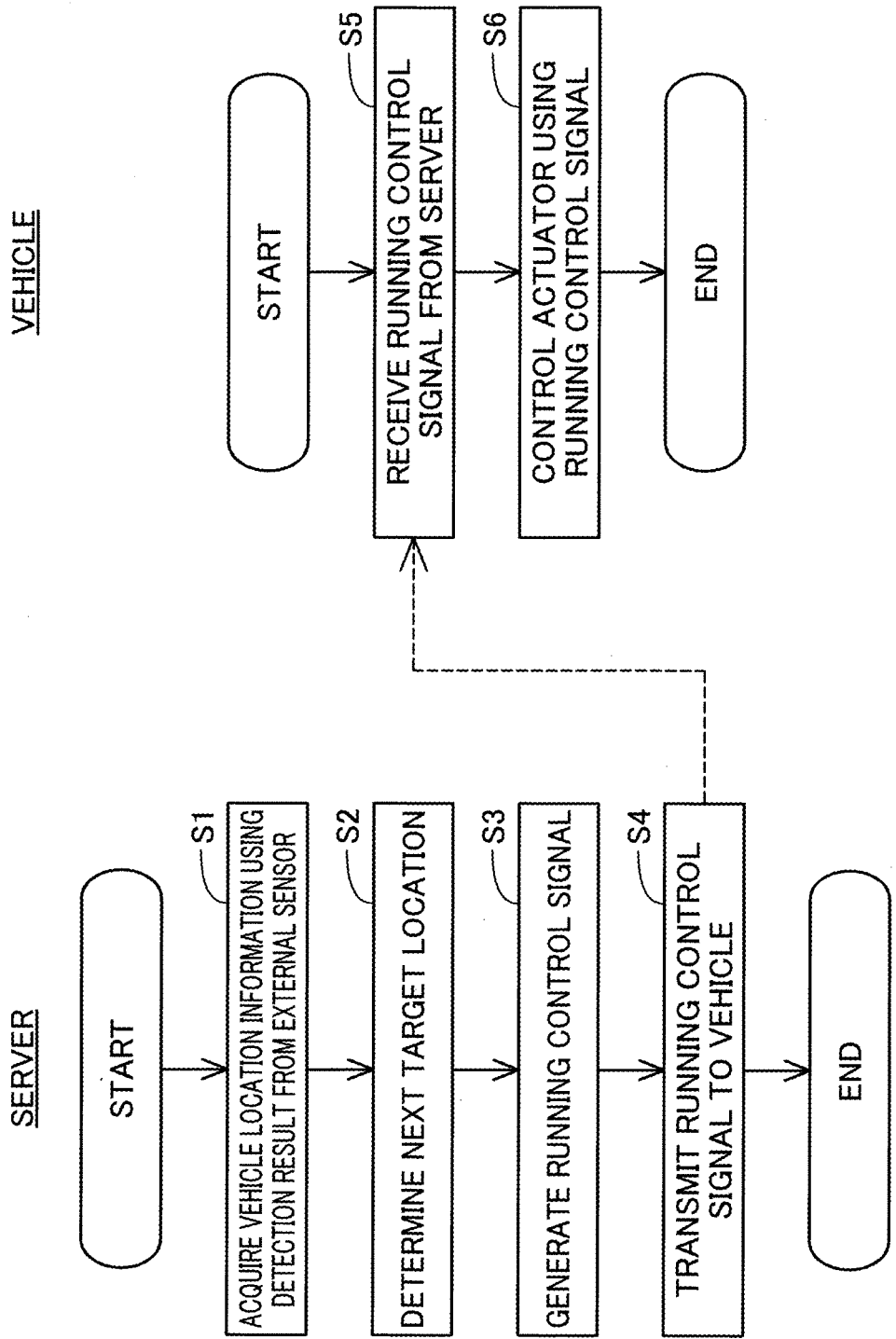
FIG. 5 is a flow chart showing a processing procedure for running control of the vehicle applicable to each embodiment.

(B6) FIG. 5 is a flowchart showing a processing procedure for running control of the vehicle 100 applicable to each embodiment. In step S1, the remote control unit 300 or a server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the server 300 acquires the vehicle location information using the captured image acquired from the camera as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the remote control system or outside the system. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system in the present embodiment, it becomes possible to move the vehicle 100 without using a transport unit such as a crane or a conveyor.

Figure 6:
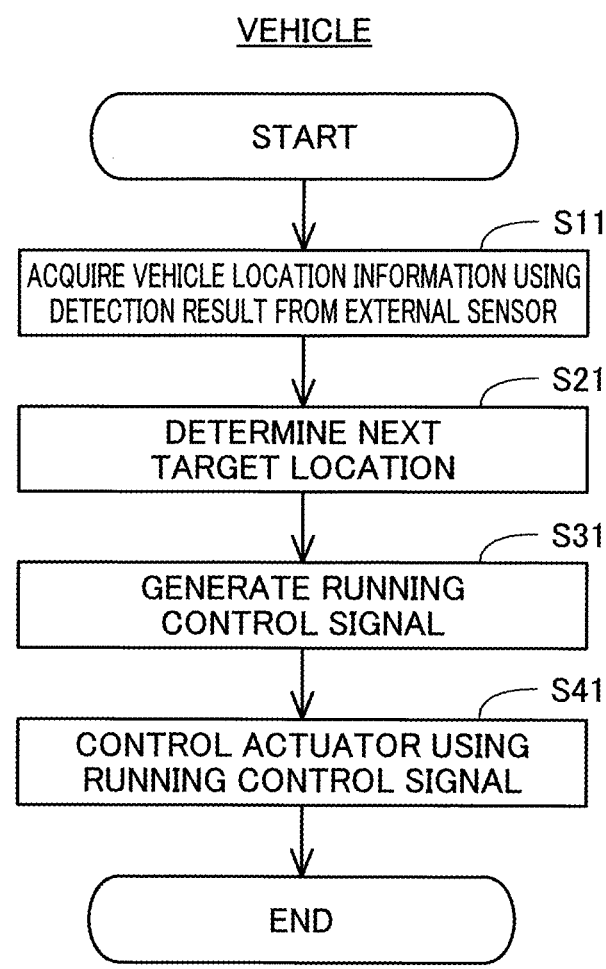
FIG. 6 is another flow chart showing a processing procedure for running control of the vehicle applicable to each embodiment.

(B7) FIG. 6 is a flowchart showing a processing procedure for running control of the vehicle 100 applicable to each embodiment. Since the configuration of the vehicle in the present embodiment is the same as in the first embodiment, the vehicle in the present embodiment is denoted as vehicle 100 for convenience. In step S901, the vehicle 100 acquires vehicle location information using detection result output from the camera as an external sensor. In step S902, the vehicle 100 determines a target location to which the vehicle 100 is to move next. In step S903, the vehicle 100 generates a running control signal for causing the vehicle 100 to run to the determined target location. In step S904, the vehicle 100 controls an actuator using the generated running control signal, thereby causing the vehicle 100 to run by following a parameter indicated by the running control signal. The vehicle 100 repeats the acquisition of vehicle location information, the determination of a target location, the generation of a running control signal, and the control over the actuator in a predetermined cycle. According to the running control in the present embodiment, it is possible to cause the vehicle 100 to run by autonomous control without controlling the vehicle 100 remotely using the server 300.

(B8) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(B9) In the above-described first embodiment, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(B10) In the above-described embodiment in which the vehicle 100 can be running by autonomous control, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(B11) In the above-described embodiment in which the vehicle 100 can be running by autonomous control, the vehicle 100 acquires vehicle location information using detection result from the external sensor. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control an actuator of the vehicle 100 using the generated running control signal. In this case, the vehicle 100 is capable of running without using any detection result from an external sensor. The vehicle 100 may acquire target arrival time or traffic congestion information from outside the vehicle 100 and reflect the target arrival time or traffic congestion information in at least one of the route and the running control signal. The functional configuration of the system may be entirely provided at the vehicle 100. Specifically, the processes realized by the system in the present disclosure may be realized by the vehicle 100 alone.

(B12) In the above-described first embodiment, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(B13) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(B14) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(B15) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and techniques described in this disclosure may be implemented by a dedicated computer provided by configuring a processor and a memory programmed to perform one or more functions embodied by the computer program. Alternatively, the control unit and the technique described in the present disclosure may be realized by a dedicated computer provided by configuring a processor by one or more dedicated hardware logic circuits. Alternatively, the control unit and the method described in the present disclosure may be implemented by one or more dedicated computers configured by a processor programmed to execute one or more functions and a combination of a memory and a processor configured by one or more hardware logic circuits. In addition, the computer program may be stored in a non-transitory computer-readable tangible recording medium as an instruction executed by a computer.

The present disclosure is not limited to the above-described embodiments, and can be realized with various configurations without departing from the spirit thereof. For example, the technical features in the embodiments corresponding to the technical features in the respective embodiments described in the Summary can be appropriately replaced or combined in order to solve some or all of the above-described problems or to achieve some or all of the above-described effects. In addition, if the technical features are not described as essential in the present specification, they can be deleted as appropriate.

What is claimed is:

1. A power supply and demand system used in a factory for manufacturing a vehicle, comprising:
    an on-vehicle secondary battery mounted on a vehicle located in the factory, wherein the vehicle is configured to run by remote control;
    a central storage battery located in the factory and configured to store power and supply the stored power to an equipment used in the factory;

a power generating facility located in the factory, the power generating facility configured to generate electric power and supply the generated electric power to the central storage battery;

a charging device configured to supply electric power stored in the central storage battery to the on-vehicle secondary battery;

a power receiving device configured to supply electric power stored in the on-vehicle secondary battery to the central storage battery; and a control unit configured to acquire a change of a power generating amount of the power generating facility and a change of a power consumption amount of the central storage battery, and to determine a target charging rate of the central storage battery based on the acquired change of the power generating amount of the power generating facility and the acquired change of the power consumption amount of the central storage battery.

2. The power supply and demand system according to claim 1, wherein the control unit configured to determine the target charging rate of the central storage battery by using a change of a number of vehicles produced in the factory.

3. The power supply and demand system according to claim 1, wherein the control unit configured to prompt charging from the charging device to the on-vehicle secondary battery when a charging rate of the central storage battery is equal to or higher than a predetermined upper limit value or is predicted to be equal to or higher than the upper limit value.

4. The power supply and demand system according to claim 3, wherein the control unit configured to prompt charging from the on-vehicle secondary battery to the central storage battery via the power receiving device when a charge rate of the central storage battery is less than or equal to a predetermined lower limit value or is predicted to be less than or equal to the lower limit value.

* * * * *